April 8, 1947. A. WHITMER 2,418,798
INFLATABLE CRASH LANDING DEVICE FOR AIRPLANES
Filed June 23, 1944 3 Sheets-Sheet 1
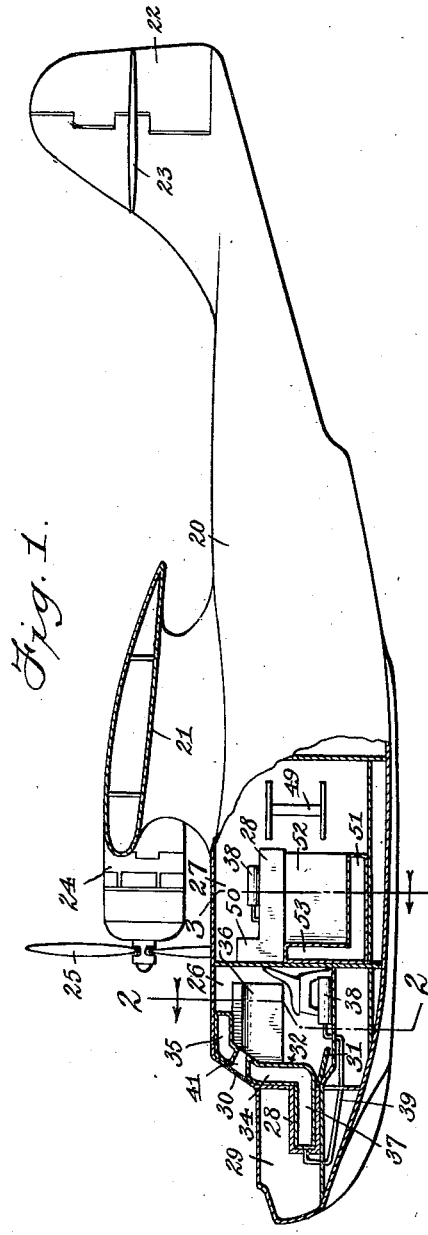
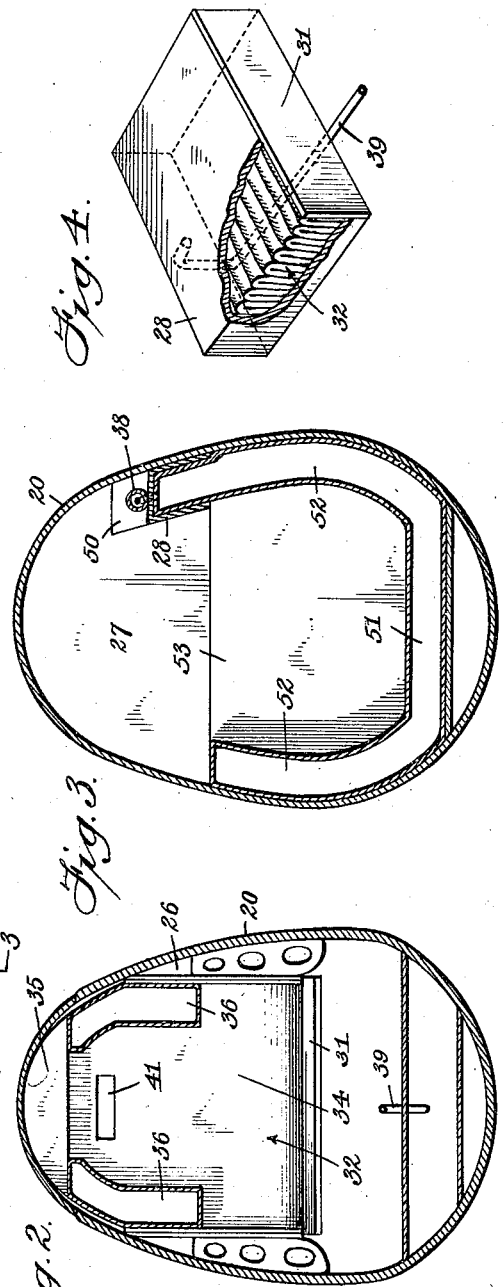
Arnold Whitmer, Inventor
By Emil Kenkark
Attorney.

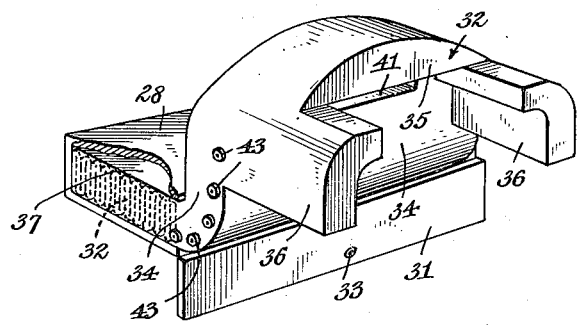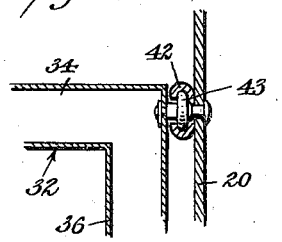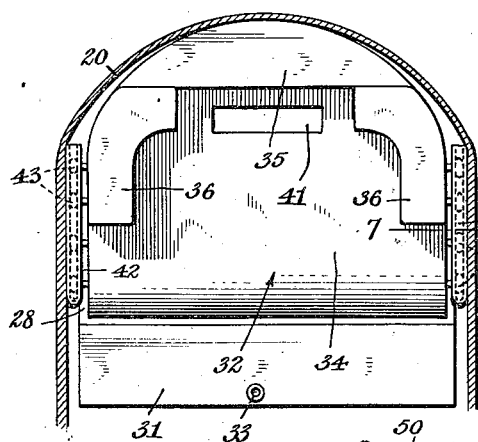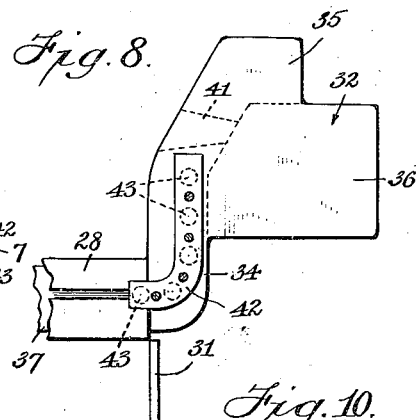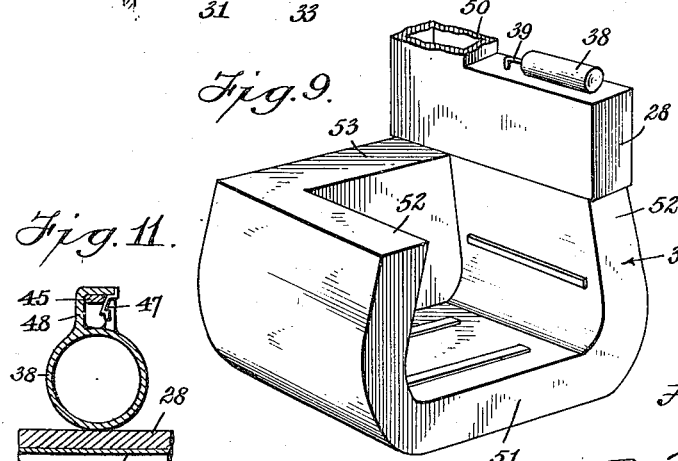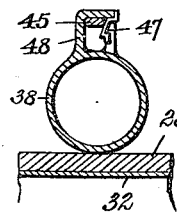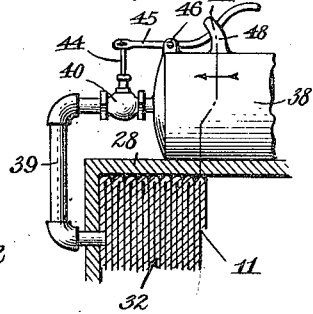

April 8, 1947. A. WHITMER 2,418,798
INFLATABLE CRASH LANDING DEVICE FOR AIRPLANES
Filed June 23, 1944 3 Sheets-Sheet 3
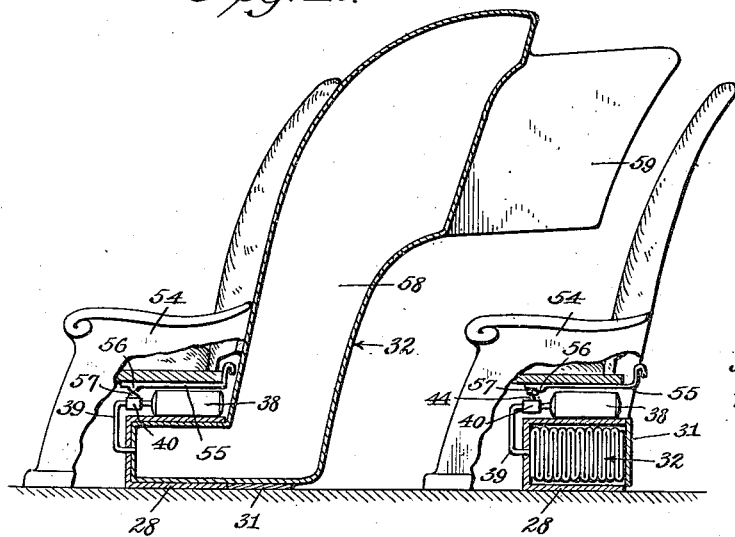
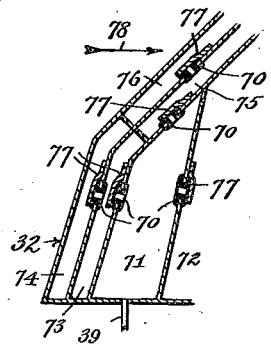
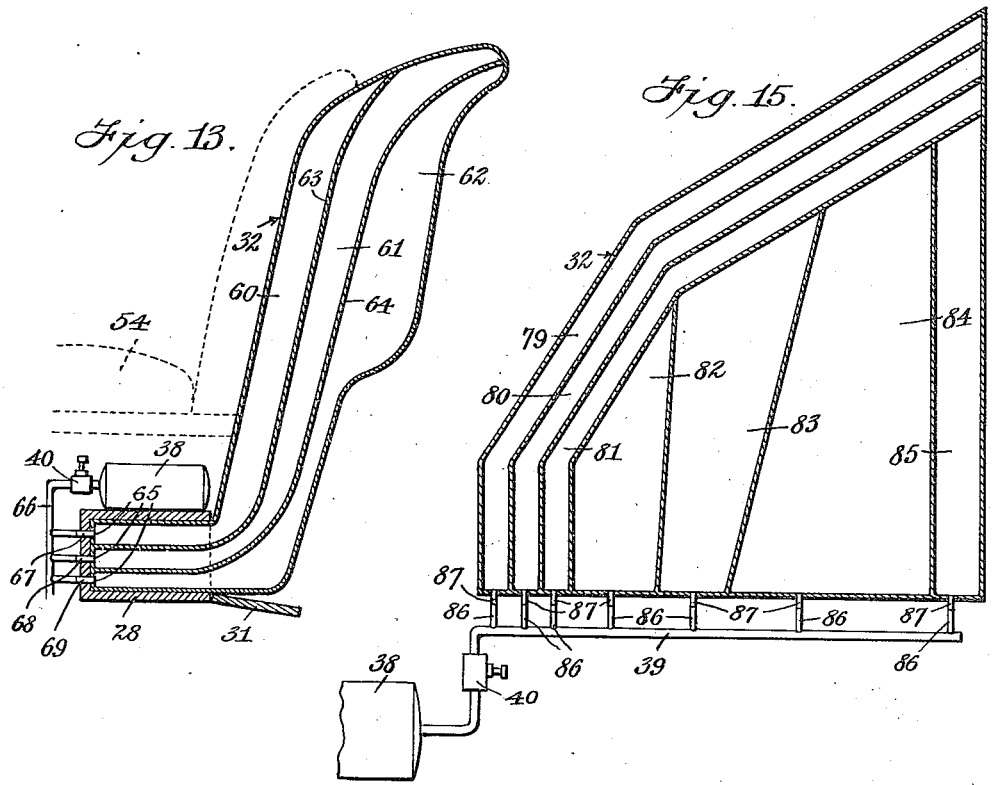
Arnold Whitmer, Inventor
By Emil Keuhart
Attorney.

Patented Apr. 8, 1947

2,418,798

UNITED STATES PATENT OFFICE 2,418,798

INFLATABLE CRASH LANDING DEVICE FOR AIRPLANES

Arnold Whitmer, Buffalo, N. Y., assignor to Arthur G. Evans, Springville, N. Y.

Application June 23, 1944, Serial No. 541,685

19 Claims. (Cl. 244—121)

My invention relates to safety means for airplanes and its chief object is to provide means whereby the occupants of an airplane, regardless of their positions or stations therein, will be protected from injuries now commonly occurring when airplanes collide in transit and particularly when colliding with a fixed object, such as a high building or other structure, a mountain or a cliff, or when, due to motor failure forced landing is made and the pilot loses control of the plane.

Due to the fact that in accidents of the kind mentioned, the impact of the airplane will cause the occupants to be propelled in the direction of travel, it is another object of my invention to provide cushioning means forward of each occupant against which they are uncontrollably forced, and preferably to so construct said cushioning means that they are normally out of their protecting positions until the occupants realize a crash is imminent.

A further object is to provide normally deflated, compactly stored cushioning means capable of being quickly inflated and assuming a protecting position forward of an occupant of the airplane.

A further object is the fabrication of inflatable structures so that when inflated, they will assume shapes that will protect occupants at the front and side, and so they conform to parts of the airplane or fixtures thereof and thus provide a suitable support or backing for the structure.

A still further object is to provide inflatable protecting means normally collapsed and contained within a housing or casing and which is associated with a flask or tank containing a compressed gaseous fluid adapted to be delivered into the collapsed protecting means and cause the same to be ejected from the housing or casing and inflated to assume the shape and position intended for it to protect any occupant in the region immediately in rear.

A still further object is to provide an inflated protector of the type mentioned which is divided into sections containing gaseous fluids under varying pressures.

The various objects of this invention will be better understood from the description to follow as applied to the several embodiments of the invention, which are illustrated for the purposes of exemplification and will necessarily be varied according to the positions or stations of the occupants and the location and formation of plane regions or fixtures immediately present.

Reference is now had to the drawings in which—

Fig. 1 is a sectional elevation of an airplane showing my improved safety or protecting means inflated in front of the pilot's seat and in front of a gunner's station.

Fig. 2 is an enlarged transverse section taken on line 2—2, Fig. 1.

Fig. 3 is an enlarged transverse section, taken on line 3—3, Fig. 1.

Fig. 4 is a perspective view of a housing or casing in which my inflatable safety or protecting element is confined and which is capable of being placed in any position in an airplane where it will serve its purpose.

Fig. 5 is a perspective view of the safety or protection means shown for the pilot in Fig. 1, the same being ejected under fluid pressure from its housing or casing and fully inflated, one end board of the housing or casing being removed to better illustrate the invention.

Fig. 6 is a transverse section of the upper portion of the fuselage of the airplane taken in rear of the safety or protecting means for the pilot and showing a rear view of said means.

Fig. 7 is an enlarged horizontal section taken on line 7—7, Fig. 6.

Fig. 8 is a side elevation of the safety or protecting means for the pilot, the front portion of the housing or casing for the same being broken away.

Fig. 9 is a perspective view of the safety or protecting means for the gunner shown in Fig. 1, the uppermost portion of the housing or casing for the same being broken away.

Fig. 10 is a section through a portion of a housing or casing for the inflatable element of my invention, showing a portion of said element therein, its connection with the compressed-fluid tank and a means for releasing the fluid from the tank and delivering it to said element to inflate the same.

Fig. 11 is a vertical section taken on line 11—11, Fig. 10.

Fig. 12 is a sectional side view of two passenger seats within a plane, showing my improved safety or protecting means collapsed and encased underneath one seat and the similar means normally collapsed and encased under the other seat, ejected and inflated for protection to the occupant of the first-mentioned seat.

Fig. 13 is a partial section through a modified form of inflatable element, such as may be used in front of a pilot's or passenger's seat.

Figs. 14 and 15 are sectional views showing further modifications of my invention.

In the detailed description to follow, like numerals of reference refer to like parts in the several figures of the drawings.

The reference numeral 20 designates the fuselage of the airplane shown, 21 one of the wings, 22 the rudder, 23 one of the stabilizers, 24 one of the motors, 25 one of the propellers, 26 the pilot cabin, and 27 a gunner's chamber.

The illustration of the airplane is somewhat diagrammatical, as no attempt is made to illustrate proper construction, true proportions, or details, since the view shown is merely to illustrate the application of my invention in some of its various forms to one of many types of planes.

Airplanes being built for various purposes require different applications of my invention but in all instances, the inflatable protecting or cushioning unit to be hereinafter described is normally deflated and in collapsed or folded form it is confined within a box, housing or casing, which I prefer to term a propulsion unit, from which the protecting or cushioning unit is projected under force of air, carbon dioxide, or any other compressed gaseous fluid released thereinto.

For example, in Fig. 1 of the drawings, the propulsion unit in the form of a box 28 is arranged in a space 29 forward of the pilot's cabin 26 and in a plane beneath the usual plexi-glass windshield 30, and while the rear end of this propulsion unit is normally closed by a cover or lid 31, best shown in Fig. 4, to retain the protecting or cushioning unit therein in collapsed and folded condition, said protecting or cushioning unit may be otherwise retained therein.

In Fig. 4 this propulsion unit is shown with the protecting or cushioning unit 32 folded therein and the cover or lid 31 thereof closed. This cover or lid may be hinged at its lower edge and retained in closed position by a spring catch 33.

The protecting or cushioning unit 32 in each instance is formed of sheets, strips, or pieces of rubberized or other fluid-tight material, cemented together to form a protecting or cushioning-device having the desired shape when inflated to provide cushion-regions, sections or members, one opening into the other, and in some instances, each separated from others by intervening walls or partitions, as will be more definitely referred to hereinafter.

It is, of course, understood that the shapes of the protecting or cushioning-units are varied, depending on the use to which they are to be put, the place of use within the airplane and the location of the occupants, and particularly on the shape of the walls of the airplane at the point of use or the equipment used within the airplane. Each unit is therefore tailored so as to be particularly adapted to the conditions existing at the point of use, and for this reason I have shown a protecting or cushioning unit in the drawings for a pilot, a gunner and a passenger. Regardless of the shape of the unit when expanded, it will be foldable into a box, housing or other retainer when deflated; such retainer having been hereinbefore referred to as a propulsion unit.

The protecting or cushioning-unit 32 shown in the pilot's cabin 26 is tailored to provide a hollow upstanding leg or member 34 which is in rear of the instrument board and the windshield and at the upper end of this leg or member a rearward horizontal extension or member 35 is shown, which opens directly thereinto and conforms to the top wall of the cabin. Extending rearwardly from opposite sides of the leg or member 34 near its upper end are wings or members 36 which have their outer sides conforming substantially to the adjacent region of the fuselage, and extending forwardly from said leg or member is a confined arm or member 37 which is closed at its outer end and fastened to the front wall of the box or propulsion unit; the walls of said arm or member lying in contact with the walls of said box or propulsion unit. The protection unit formed as described provides a space directly forward of the pilot which has a top wall formed by the rearward horizontal extension 35, a front wall formed by the leg or member 34, and side walls formed by the rearwardly extending wings 36.

It is to be understood that portions of the fuselage structure serve as a backing for the protecting or cushioning unit, or that some equipment or fixtures must be depended upon to serve as a backing where the structure of the fuselage will not lend itself for that purpose.

In association with the protecting or cushioning unit I employ a flask 38 containing compressed air, carbon dioxide, or any other suitable compressed gaseous fluid and connecting the same by means of a pipe or other suitable conduit 39 with the closed and secured end of the arm or member 37 of the protecting or cushioning unit. In this pipe or conduit a suitable control 40 in the form of a valve is arranged; the control in all instances being within convenient reach of the person or persons to be protected.

As clearly shown in Fig. 4, the protecting or cushioning unit is deflated and folded uniformly into its receiving box or housing, after which the box may be closed. Under such conditions, the pilot has a clear vision ahead and the safety means for the pilot occupies comparatively little space and in no manner interferes with the operation of the airplane in the manner intended for it.

In the event of a collision or crash being imminent, it is only necessary for the pilot to open the control 40 at the flask 38, whereupon the compressed fluid is delivered from the flask into the deflated, folded and confined protecting or cushioning unit within the box or propulsion unit 28. The air so delivered acts to inflate the protecting unit, exerting sufficient pressure against the cover of said box or propulsion unit to release the spring catch thereof and force said cover open; at the same time the deflated protecting or cushioning unit is propelled outwardly unfolding one folded region thereof after the other successively and by reason of the shape given said unit, it gradually assumes its true inflated condition, due to the shape of the pieces of material from which it is constructed and the connection of said pieces one with the other. As it is propelled out of the box it rises to the shape shown in Fig. 1 and contacts the several walls of the pilot's cabin; thereby providing the required protection for the pilot in the case of a crash occurring.

In that event, the sudden stoppage of the plane will drive the pilot forward in contact with the inflated structure and save him from injury, or at least minimize his injuries. When driven forward and possibly upwardly or laterally componently with a forward lunge, his entrance into the space, or the well as it may be termed, formed by the several angularly-disposed members of the inflated structure, will protect him from the front, sides and top.

As it would require time to deflate and properly refold the protecting or cushioning unit and return the same to the propulsion unit and such time may not be then available, provision is made to enable the pilot to continue his flight after the protecting or cushioning unit is inflated. For this reason a sight-opening 41 is formed in the leg or member 34, the walls of which are flared forwardly and through this sight-opening the pilot will have a clear view ahead.

Flight may sometimes be continued after a crash when the damage to the plane is not severe and at times an impending crash will have been avoided, yet the necessary precaution taken to protect the occupant by inflating and properly positioning the inflated unit. At such times the use of the sight-opening will enable the plane to be flown to its destination, where time will permit the unit to be deflated and stored in its receiving receptacle or propulsion unit and another pressure flask connected therewith in the event that the compressed fluid then in use has become exhausted.

To aid the protecting or cushioning unit to ride into its proper protective position when being inflated, guide tracks 42 are fastened to the walls of the fuselage at opposite sides and their lower ends are directed forwardly at opposite sides of the box, or casing 28 serving as the propulsion device, as best shown in Figs. 5 to 6. The sides of the leg or member 34 have a series of guide rollers 43 secured thereto which travel in the tracks 42 and thus direct the protecting or cushioning unit while being inflated in the proper course. Any other means for properly guiding or directing the expanding unit may of course be devised for the purpose.

In Figs. 9 and 10 a simple control device for liberating the compressed fluid is shown, the valve 40 thereof having a common spring-pressed valve-stem 44 projecting therefrom, to the outer end of which a lever 45 is connected which is fulcrumed between its ends, as at 46, and which upon being pressed down, will lift the valve stem and open the valve to allow the fluid to flow from the flask to the deflated protecting or cushioning unit. When depressed, the lever will be so retained by a spring 47 secured to a bracket 48 rising from the flask.

The protecting or cushioning unit 32 shown in the gunner's chamber 27 is of somewhat different shape so as to conform to certain walls of said chamber. In this application of my invention the box or propulsion device may be arranged at one side of the chamber forward of the gun-mount, designated by the numeral 49 and the cover or lid of the box or propulsion device is at the bottom. It may be necessary to provide the box with an upward extension 50 because of the added material in certain regions of the protecting or cushioning unit.

As in the case of the safety device designed for the pilot's cabin, the compressed-fluid flask 38 is suitably mounted within easy reach of the occupant to be protected and it is connected in any suitable manner to the interior of the deflated and folded protecting or cushioning unit in the propulsion device. As shown the said unit is propelled downwardly and when inflated is in the form of a U-shaped cushioning cradle having a bottom member 51 resting upon the floor of the gunner's chamber, two side members 52 bearing against the sides of said chamber, and a front member 53 bearing against a wall or partition separating said chamber from other portions of the plane. In this manner the several members of the protecting or cushioning unit have the required backings to sustain the weight of occupants impelled thereagainst.

It will be apparent that when notified a crash is imminent, or even impending, the occupant of the chamber may release the unit 32 and fall into the cradle formed thereby for protection at the front and sides. In the event that the crash takes place before he is able to protect himself by his own efforts, he will be forcibly impelled into the cradle and be automatically protected from injury, or at least his injuries will be greatly minimized.

In Fig. 12 I have shown my invention applied to passengers' seats, such as transport planes are provided with. The seats designated by the numeral 54 may vary in design or construction, but regardless of these features there invariably is space provided underneath the seat and the space underneath each seat is occupied by a safety device adapted for protecting a passenger in the seat immediately in rear of the same.

The box, casing or propulsion-unit 28 has the protecting or cushioning unit 32 normally folded thereinto, as shown at the right of the Fig. 12, and mounted on the propulsion-unit is the flask 38 connected to the protecting or cushioning unit in substantially the same manner as provided for in the safety devices designed to protect the pilot and the gunner and hereinbefore described.

The control or valve 40, in this instance, may be operated by a slide bar 55 arranged underneath the seat and conveniently accessible to the passenger directly in rear thereof. This slide bar has a rounded protuberance 56 which is designed for engagement with a convex head 57 on the stem 44 of the control or valve 40. When pressing the slide bar 55 forwardly from the position shown underneath the seat at the right in Fig. 12, to the position shown for the slide bar underneath the seat shown at the left in the said figure, the valve stem is depressed and the valve opened to allow the compressed fluid to flow from the flask into the inflatable protecting or cushioning unit, whereupon said unit is inflated and assumes the position shown at the left in said figure. In said figure, the outline of the protecting or cushioning unit conforms to the back of the seat to which it is applied, lies thereagainst and extends rearwardly to form the inflated main or body portion 58, from which extend wings 59 which open directly into said body portion and are arranged at opposite sides of the latter. Thus the body portion 58 is adapted to intercept the forward lunge of the passenger, while the wings protect the passenger from any lateral thrusts that may occur. It is, of course, understood that the control of the compressed fluid from the flask to the protecting or cushioning unit, may to be established by other means.

To guard against the collapse of the protecting unit in the event of the front wall of the unit being punctured, the protecting or cushioning unit may be constructed with a plurality of sections or chambers, such as shown in Fig. 13 and designated by the numerals 60, 61 and 62. In this figure I have illustrated a protecting or cushioning unit for the back of a passenger seat slightly different in outline from the unit applied to the seat shown in Fig. 12. The sections or chambers 60 and 61 are separated from each other in a fluid-tight manner by a wall or partition 63, and the sections 61 and 62 are separated in a like manner by a wall or partition 64, each section or chamber having a separate compressed-fluid inlet, shown at 65, and all inlets being connected with a fluid-supply pipe 66 leading to the compressed fluid flask 38 and having the control or valve 40 therein.

The several chambers, which may vary in number, may have the compressed fluid therein under like pressures, or the pressures in the chambers may be varied, which can be easily accomplished by inserting between the inlets 65 and the fluid-supply pipe 66, fluid-reduction valves 67, 68, and 69 of any suitable type, each being set or adjusted to the desired pressure under which the compressed fluid is to be delivered into the several chambers of the unit. For example, the pressure at which the fluid in the chamber 60 is to be maintained would exceed the pressure in the chamber 61 and the pressure in the latter chamber would exceed the pressure in chamber 62. Assuming a pressure of 25 lbs. per square inch is to be maintained in chamber 60, 20 lbs. per square inch in chamber 61, and 15 lbs. per square inch in chamber 62, the force under which a passenger being impelled against the protecting or cushioning unit might cause the rear wall of the unit to strike the wall or partition 64 separating the section or chamber 62 from the section or chamber 61 and force said wall or partition forwardly toward the wall or partition 63 separating the section or chamber 61 from the section or chamber 60, or both the rear wall and the wall or partition 64 might, under the force of the forward lunge of the passenger, cause the latter wall or partition to bulge the partition 63, separating the section or chamber 61 from the section or chamber 60, and thus a gradual compression of the unit would take place with the cushioning effect eased so that the tendency of the passenger rebounding would be greatly minimized. On the other hand, should the front wall of the unit become punctured to cause the forward section or chamber to become deflated, there still would be a cushioning effect obtained due to the inflated condition of the two remaining chambers or sections 61 and 62.

In Fig. 14 I have shown a portion of a modified form of protecting or cushioning unit designed for use against the wind-shield of an airplane for the purpose of protecting the pilot. In this instance, the unit is also provided with separated sections or chambers, into one of which only fluid is delivered through the fluid-supply pipe or conduit 39. In this particular embodiment of my invention I apply grommets 70 in the walls or partitions dividing the sections or chambers one from another. In the illustration of this embodiment at least six different sections or chambers are shown, designated by the numerals 71, 72, 73, 74, 75 and 76. These chambers may, of course, vary in number. The fluid is introduced into chamber 71 and from said chamber passes through grommets into chambers 72, 73 and 75, and from the last two chambers through grommets into chambers 75 and 76. Behind each grommet is a sealing flap 77, which automatically closes the openings through the grommets against the direction of the fluid passing from one section or chamber to the other. Thus in the event any section lacks the fluid and becoming deflated, the remaining sections will remain inflated and serve to protect the pilot stationed behind the safety device.

It is also to be noted that in a construction of the type shown in Fig. 14, the chambers extend upwardly into different horizontal planes or extend to different levels so that one chamber reaching a higher level than others would be punctured, yet all other chambers would remain inflated and serve to protect the pilot. For example, in the event of the device being punctured at the level indicated by the arrow 78 in Fig. 14, the section or chamber 76 would become deflated, unless the impact were sufficient to also puncture the section directly in rear of said chamber, in which case both the sections or chambers 76 and 75 would become deflated, but all other chambers would remain inflated and be capable of absorbing the thrust of any body impelled thereagainst.

In Fig. 15, a still further modification of my invention is shown wherein separated sections or chambers 79, 80, 81, 82, 83, 84, and 85 are provided, some of which extend to higher levels than others so that here too it is possible to puncture one or more sections or chambers without deflating all of them. When all sections or chambers are inflated, section or chamber 85 may, for example, be inflated under 15 lbs. pressure per square inch; section or chamber 84 under 20 lbs. pressure per square inch; section or chamber 83 under 25 lbs. pressure per square inch; section or chamber 82 under 30 lbs. pressure per square inch; and sections 79, 80 and 81 under 35 lbs. pressure per square inch. The sections or chambers are, therefore, successively softened from front to rear so that impact of the body against the safety device would cause the body to be taken into the device gradually without rebounding, as would happen to be the case were the rearmost and other sections inflated with fluid-pressure at 35 lbs. per square inch. Even if the sections or chambers 79, 80 and 81 were punctured or deflated, in the event of a crash taking place, the remaining sections 82, 83, 84 and 85 would still remain inflated and serve as a cushioning or protecting unit. Even though section 82 were also included among those deflated, sections 83, 84 and 85 would still function as a protecting or cushioning unit.

Like the protecting or cushioning units hereinbefore described, the unit shown in Fig. 15 and last described, is connected with the flask 38 by means of the pipe or conduit 39 having the control or valve 40 therein, each section or chamber having separate inlet-pipes 86 supplied with fluid-reduction valves 87 of any approved construction. The reduction valves for the sections or chambers 79, 80 and 81 are, for example, set or gauged to deliver compressed fluid from the tank 38 until the pressure within said sections or chambers reaches 35 lbs. per square inch, whereupon the said reduction valves automatically close. The fluid-reduction valve 87 leading the compressed fluid into the chamber 82 automatically closes when the pressure in said section or chamber reaches 30 lbs. per square inch and the reduction valves for the remaining sections or chambers 83, 84, and 85 close automatically as the pressure in said chambers reaches 25, 20 and 15 lbs. per square inch, respectively. Any other means whereby pressures may be varied in separated or segregated sections or chambers of the protecting or cushioning unit, may be employed without departing from the principle involved.

In each of the embodiments of my invention, I have illustrated a protecting unit with a transverse or substantially transverse cushioning member which is associated with cushioning members disposed at an angle thereto. The transverse or substantially transverse cushioning member is highly essential, since in a head-on crash the occupants are impelled forwardly and directly against the same and the impact is thus absorbed by said member. However, since in crashes a pilot oftentimes looses complete control of the airplane, the latter may swing laterally or even roll over, and in such cases the cushioning members of the protecting unit disposed at an angle to the transverse cushioning member protect the occupants from injury.

In some instances the angular cushioning member, such as the wings 36 in Fig. 1, the wings 59 in Fig. 12, or the members 52 in Figs. 3 and 9 are at the ends of the transverse cushioning member and thus protect the occupants when impelled in a side-wise manner. In another instance, an angular-cushioning member, such as member 51 in Figs. 3 and 9, is at the bottom of the transverse cushioning member and this protects the occupant from injury due to impact of the airplane from the bottom. The angular cushioning member 35 shown in Fig. 1 protects the occupant from injury when impact is downward, also when the airplane is caused to roll over, as sometimes happens.

It is, of course, understood that the term "airplane" is not herein employed in a restrictive sense, since my improved protecting unit could be employed in passenger cars or other transporting vehicles, and it is my intention that the term airplane employed in the claims shall be construed broadly and to include any other transport vehicle; also that in a broad sense, the protecting unit may, when used in some forms of vehicles, be maintained in an inflated condition.

Having thus described my invention what I claim is:

1. A safety device for airplanes, comprising a housing, a protecting unit deflated within said housing and adapted to be inflated and propelled therefrom to assume a position in front of an occupant of the plane to receive the impact of the occupant under uncontrolled forward movement; means under the control of an occupant of the plane to introduce compressed fluid into said deflated unit within said housing and cause said unit to be propelled from said housing and be inflated to receive the impact of an occupant of the plane when under uncontrolled forward movement.

2. A safety device for airplanes, comprising a housing, an inflatable protecting unit normally deflated and folded within said housing, said protecting unit, when inflated, having a transverse cushioning member located in front of an occupant of the airplane and adapted to lie in contact with a rigid portion of the airplane so as to absorb the shock of said occupant in the event of a head-on crash occurring, and means under control of an occupant of the airplane for introducing compressed fluid into said protecting unit when folded within said housing so as to cause said unit to be propelled from said housing and be inflated to form said cushioning member.

3. A safety device for airplanes for absorbing the impact of uncontrolled movement of an occupant in case of a crash, comprising a housing within the airplane in non-protecting position with respect to said occupant, an inflatable protecting unit normally deflated within said housing, said unit having a transversely-disposed cushioning member when inflated for which a rigid part of the airplane serves as a backing and inflated wings extending rearwardly from opposite ends of said cushioning member, said cushioning member being so constructed and positioned as to have an occupant of the airplane impelled thereagainst in the event of a head-on crash occurring and said inflated wings protecting said occupant under uncontrollable sidewise movement of the airplane.

4. A safety device for an airplane comprising a normally deflated protecting unit normally located in the airplane in non-protecting position in a plane in front of an occupant of the airplane and formed of thin material impervious to gaseous fluids and fashioned of pieces of such material united together at their edges to assume an inflated pre-designed shape in front of said occupant when inflated capable of absorbing the shock of said occupant when propelled against said protecting unit, and means for delivering gaseous fluid into the normally deflated protecting unit for inflating and positioning the same directly forward of said occupant when a crash appears to be imminent.

5. In an airplane having a pilot cabin and a windshield through which a pilot in the cabin is enabled to view his course ahead, a protecting unit normally deflated and stored adjacent the wind-shield, said protecting unit being inflatable and so constructed and arranged that when inflated it will assume a position in rear of the wind-shield, and means under control of the pilot within said cabin to cause said protecting unit to be inflated when a crash appears imminent.

6. In an airplane having a pilot cabin and a wind-shield through which a pilot in the cabin is enabled to view his course ahead, a protecting unit normally deflated and stored adjacent the wind-shield, said protecting unit being inflatable and so constructed and arranged that when inflated it will assume a position in rear of the wind-shield and being provided with a sight-opening through which the pilot may view his course ahead, and means under control of the pilot within said cabin to cause said protecting unit to be inflated when a crash appears imminent.

7. In an airplane having a pilot cabin and a wind-shield through which a pilot in the cabin is enabled to view his course ahead, a housing opening rearwardly and positioned in the airplane underneath and forward of said windshield, an inflatable protecting unit normally deflated and folded in said housing, a compressed gaseous fluid container, a conduit leading from said container to said protecting unit and opening thereinto, and means in said conduit accessible to the pilot in said cabin to control the delivery of the compressed fluid into said deflated unit, said protecting unit being so constructed and arranged that inflation thereof causes it to be propelled from said housing and assume an inflated condition in rear of said wind-shield to protect the pilot when a head-on crash occurs.

8. A safety device for airplanes to absorb shocks under uncontrolled forward movement of an occupant, comprising a housing in non-protecting position, an inflatable normally deflated protecting unit folded within said housing, means to supply a gaseous fluid to said unit when deflated to cause the same to be propelled from said housing while being inflated and assume a protecting position in front of an occupant when inflated, and guiding means for causing said unit to move into body-protecting position while being inflated to receive the shock of the occupant when a head-on crash occurs.

9. In an airplane having a plurality of passenger seats arranged in a row, one in front of another, an inflatable protecting unit normally deflated and positioned forward of each passenger's seat and underneath the seat directly ahead, means to cause each protecting unit to be inflated and assume a protecting position in contact with the back of the seat directly ahead.

10. In an airplane having a plurality of passenger seats arranged in a row, one in front of another, an inflatable protecting unit normally deflated and positioned underneath each seat, means accessible to each passenger to cause the protecting unit underneath the seat ahead to be inflated and assume a protecting position in contact with the rear surface of said seat ahead so as to provide protecting cushions for occupants directly in rear of the inflated protecting units in the event of a crash occurring.

11. In an airplane having a gunner's chamber, an elongated housing normally disposed at the side of said chamber in an elevated position and opening downwardly, an inflatable normally deflated protecting unit folded in said housing and adapted to be inflated and assume the form of a U-shaped cushioning cradle having a bottom member adapted to rest upon the floor of the gunner's chamber, two side members and a front member adapted to bear against a rigid portion of the airplane, and means to direct compressed fluid into the protecting unit when deflated and folded to cause the same to be inflated and permit the occupant or occupants of the gunner's chamber to fall into said inflated U-shaped cradle when a crash occurs or is imminent.

12. In an airplane, a cushioning element normally deflated and when inflated being automatically positioned in such relation to an occupant in tranquil position in the airplane that when said occupant is uncontrolledly propelled from tranquil position he will come in contact with said inflated element and the shock of contact of said occupant against said element will be absorbed by the latter, said element having at least two sections separated by an intervening wall, and means to deliver a gaseous fluid to said sections under different pressures so that one of said sections is inflated to a greater degree than the other and the rebound of said occupant diminished.

13. In an airplane, an inflatable protecting unit normally deflated and when inflated being automatically positioned in such relation to an occupant in tranquil position in the airplane that when said occupant is uncontrolledly propelled from tranquil position against said inflated unit the shock of contact of said occupant against said unit will be absorbed thereby, said unit having a plurality of sections separated by intervening walls, a source of a gaseous fluid, a conduit connecting said source of fluid with each of said sections, means intervening said protecting unit and said source of gaseous fluid for varying the pressures under which said sections are inflated so that the pressures in the sections from rear to front of said unit are gradually increased, and means accessible to an occupant of the airplane for controlling the delivery of the gaseous fluid from its source to said various sections.

14. In an airplane, an inflatable protecting unit normally deflated and when inflated having regions from rear to front under increased pressures.

15. In an airplane, an inflatable protecting structure adapted to be positioned vertically in front of an occupant of the airplane to absorb the force of impact of the occupant when propelled forwardly under a head-on crash, said unit being normally deflated and when inflated having sections separated by intervening walls, said sections extending upwardly to varying heights so that when said unit is punctured at a given height, the plane of puncture will be out of line with one or more of said sections.

16. In an airplane, an inflatable protecting structure adapted to be positioned vertically in front of an occupant of the airplane to absorb the force of impact of the occupant when propelled forwardly under a head-on crash, said unit being normally deflated and when inflated having sections from front to rear separated by intervening walls, said sections extending upwardly to varying heights so that one may be punctured in a given plane without causing deflation of another or others.

17. In an airplane, a housing disposed out of body-protecting position, an inflatable protecting unit normally deflated in said housing and when inflated having a transverse cushioning member positioned in protecting relation to an occupant in the airplane so as to absorb the shock of the occupant when uncontrolledly impelled out of tranquil position under impact of the airplane against a fixed object and having at least an angular cushioning member extending rearwardly from said transverse cushioning member to protect said occupant when under uncontrolled movement in another direction.

18. In an airplane, an inflatable protecting element normally deflated and disposed in non-protecting position with relation to an occupant of the airplane and when inflated being positioned in protecting relation to said occupant so as to absorb the shock of said occupant when impelled out of tranquil position under impact of the airplane against a fixed object, and means to inflate said protecting element at the will of an occupant of the airplane when a crush is imminent.

19. In an airplane, a housing in non-protecting position with relation to an occupant in the airplane, an inflatable protecting element normally deflated in said housing and when inflated being positioned in protecting relation to said occupant so as to absorb the shock of said occupant when impelled out of tranquil position under impact of the airplane against a fixed object, and means to inflate said protecting element at the will of an occupant of the airplane when a crash is imminent.

ARNOLD WHITMER.

REFERENCES CITED

The following references are of record in the file of this patent:

UNITED STATES PATENTS

| Number | Name | Date |
|---|---|---|
| 882,057 | Forte | Mar. 17, 1908 |
| 2,210,809 | Gray | Aug. 6, 1940 |
| 1,489,619 | Tsavaris | Apr. 8, 1924 |
| 1,818,597 | Adams | Aug. 11, 1931 |
| 1,717,533 | Ward | June 18, 1929 |
| 1,027,764 | Rilleau | May 28, 1912 |
| 1,349,526 | Niedbala | Aug. 10, 1920 |
| 2,057,687 | Manson | Oct. 20, 1936 |

FOREIGN PATENTS

| Number | Country | Date |
|---|---|---|
| 423,783 | French | Feb. 24, 1911 |
| 675,617 | French | Nov. 8, 1929 |